United States Patent [19]
Hillen

[11] Patent Number: 5,884,959
[45] Date of Patent: Mar. 23, 1999

[54] IMPACT-ABSORBING DAMPING DEVICE

[75] Inventor: Alois Hillen, Blankenrath, Germany

[73] Assignee: Boge GmbH, Bonn, Germany

[21] Appl. No.: 636,737

[22] Filed: Apr. 19, 1996

[30] Foreign Application Priority Data

Apr. 20, 1995 [DE] Germany .......................... 195 14 682.4

[51] Int. Cl.⁶ ................................ B60R 19/02; F16F 9/16
[52] U.S. Cl. ............................ 293/134; 293/136; 293/132;
267/116; 267/139; 267/64.26; 188/276;
188/322.22; 188/322.19
[58] Field of Search ..................................... 293/107, 110,
293/122, 132, 133, 134, 136; 267/292,
64.11, 64.15, 116, 139, 140, 64.26; 188/276,
322.22, 322.19

[56] References Cited

U.S. PATENT DOCUMENTS

| | | | |
|---|---|---|---|
| 3,752,462 | 8/1973 | Wight, Jr. ............................. | 293/136 X |
| 3,804,446 | 4/1974 | Warrener ................................ | 293/134 |
| 4,082,338 | 4/1978 | Hutai et al. ............................. | 293/136 |
| 4,096,927 | 6/1978 | Takatsu ................................ | 293/134 X |
| 4,624,493 | 11/1986 | Hillebrand et al. ..................... | 293/136 |
| 4,893,857 | 1/1990 | Bobinger et al. ..................... | 293/132 X |
| 4,988,081 | 1/1991 | Dohrmann ........................... | 293/134 X |

FOREIGN PATENT DOCUMENTS 3419165  11/1985  Germany .

*Primary Examiner*—Joseph D. Pape
*Attorney, Agent, or Firm*—Nils H. Ljungman and Associates

[57] ABSTRACT

Impact-absorbing damping device which has at least two telescoping tubes, in particular for motor vehicles, to decelerate a vehicle when it collides with an obstacle by damping and/or spring forces, whereby the cavity of at least one tube is provided with an elastomer body.

7 Claims, 4 Drawing Sheets

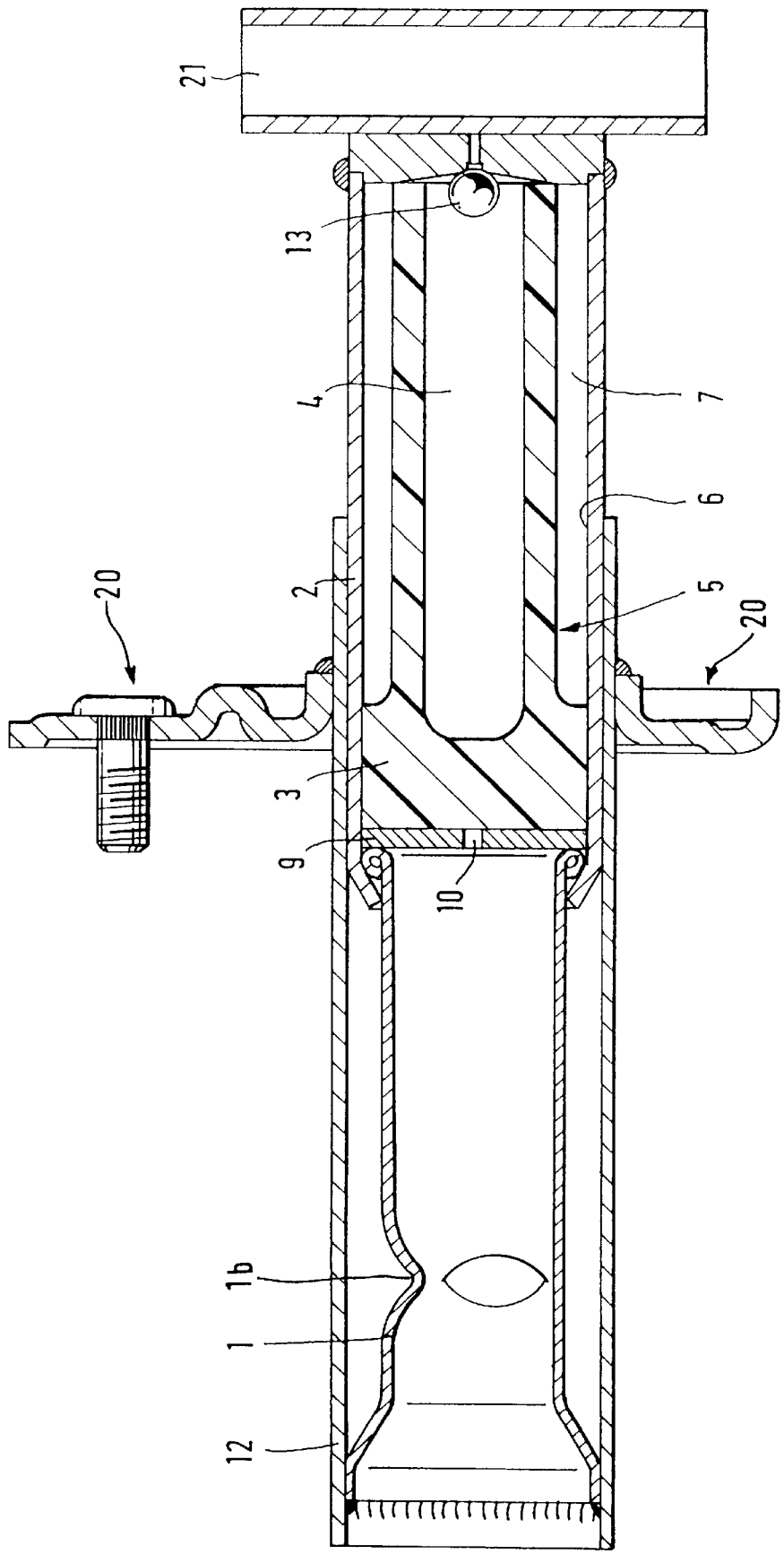

IMPACT-ABSORBING DAMPING DEVICE

BACKGROUND OF THE INVENTION

1. Field of the Invention

This invention generally relates to an impact-absorbing damping device which has at least two telescoping tubes, in particular for motor vehicles, to decelerate a vehicle when it strikes an obstacle by means of damping and/or spring forces.

2. Background Information

Known impact-absorbing damping devices (e.g. German Patent No. 34 19 165), can include two telescoping tubes, whereby a closed inner tube contains, in sequence starting from the bottom, a gas chamber which encloses a gas cushion under high pressure, a separating piston which is guided in a sealed manner and so that it can move inside the inner tube, and a first fluid chamber. The first fluid chamber is in communication with a second fluid chamber by means of a throttle point or choke point and is used to generate hydraulic damping forces. In this normal position, the maximum stroke is large enough so that it is able to absorb an impact up to 8 km/h. The volume equalization and the return of the impact-absorbing damping device into the original base position is accomplished by means of the gas cushion, which is enclosed in the closed gas space.

OBJECT OF THE INVENTION

The object of the invention is to create an impact-absorbing damping device, the construction of which is not only simple and economical, but also makes possible a device which has a light weight and which has a short axial length.

SUMMARY OF THE INVENTION

The invention teaches that this object can be accomplished by providing the cavity of at least one tube with an elastomer body. One advantage of the solution taught by the invention is that, in the event of a collision between a vehicle and an obstacle, the energy of the collision can be reduced by the friction between the elastomer and the corresponding adjacent tube. An additional reduction of energy is made possible by the deformation of the elastomer. In addition to these functional advantages, the invention also teaches that it is possible to achieve a device with a short length, a very low overall weight and an economical construction.

The invention also teaches that the elastomer body has a cavity.

In one embodiment, the invention teaches that the elastomer body, together with its outside surface and the inside surface of the tube, forms a ring-shaped space.

In one embodiment, upstream of the elastomer body there is at least one element which has at least one safety opening. It is advantageous that, as the elastomer body, a material is used which melts in the event of a fire on the vehicle, so that an overpressure can escape in a controlled manner through the safety opening, without the impact-absorbing damping device exploding.

In accordance with one essential characterizing feature, the elastomer body has a channel which empties into a cavity. The cavity is advantageously pre-pressurized with compressed gas. This pre-pressurized compressed gas in the cavity is used to restore the original position of the elastomer body after a collision up to a speed at which the metal parts are not yet deformed. Nitrogen can be used as the compressed gas, and can also be used to pre-pressurize the elastomer element and simultaneously for the return of the elastomer element to its original position following a collision between the motor vehicle and an obstacle.

In accordance with an additional characterizing feature, there is a deformation element upstream of the elastomer body. The installation of an additional deformation element is provided so that, when a vehicle collides at very high speeds with an obstacle, the deformation of one of the tubes makes a further reduction of the energy of the impact possible.

Additional capabilities for the reduction of energy can be created by providing at least one tube with a predetermined breaking point or a predetermined buckling point.

When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the figures illustrated in the accompanying drawings, in which:

FIG. 1a is the same as FIG. 1, with additional details labelled;

DESCRIPTION OF THE PREFERRED EMBODIMENT

Figure 1:
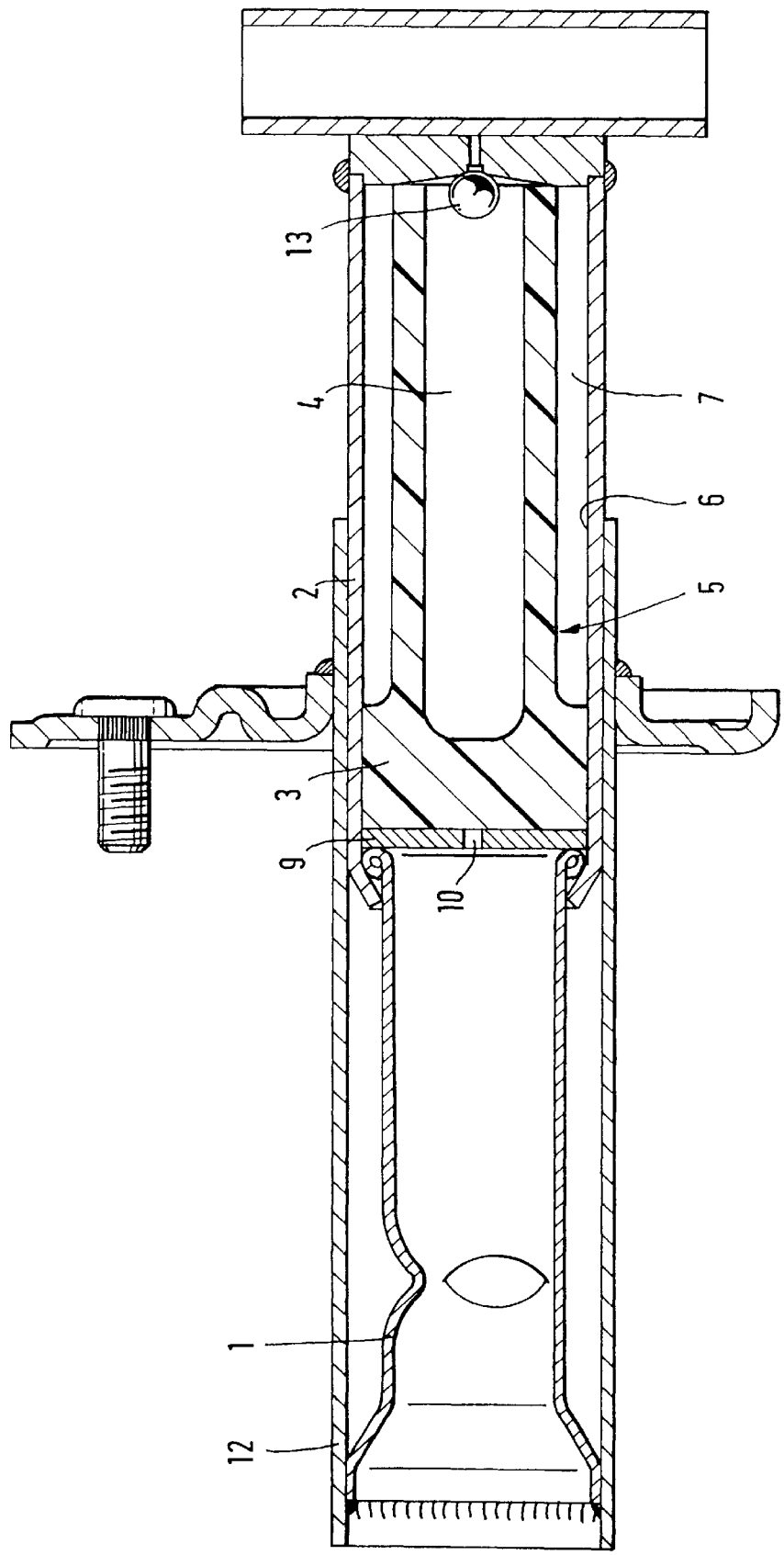
FIG. 1 shows an embodiment of an impact-absorbing damping device in cross section.

The impact-absorbing damping device illustrated in FIG. 1, inside a retaining tube 12, has a tube 1 and a tube 2, which tube 2 can move axially relative to the tube 1. Inside these tubes 1, 2, and 12 there is an elastomer body 3, which elastomer body 3, along with a cavity 4 containing a gas cushion, and a ring-shaped space 7, which ring-shaped space 7 can contain the deformed elastomer body 3, is used during an impact between the vehicle and an obstacle. The ring-shaped space 7 is thereby formed by an outside surface 5 of the elastomer body 3 and an inside surface 6 of the tube 2. A sphere 13 is used as a closing element, after the compressed gas, for example $N_2$, has been filled into cavity 4. The transmission of force from the retaining tube 12 to the elastomer body 3 takes place by means of the element 9. The safety opening 10 is used to reduce the pressure in a controlled manner in the event the vehicle is on fire, so that the danger of an explosion caused by the rapidly-expanding gas in the cavity 4 can be prevented, if the elastomer body 3 melts at a specified temperature.

In accordance with at least one embodiment of the present invention, the damping device can be connected directly to the vehicle body by means of a component, or fastening member 20 (see FIG. 1a). This fastening member 20 can be fastened, in accordance with one embodiment, to the retaining tube 12 (FIG. 1a) or in another embodiment to the the guide tube 2 (FIG. 2a). In addition a connecting piece 21 can be fastened to the bumper of the vehicle. Alternatively, other types of fastening arrangements could be conceivable which would be well within the skill of the artisan. In accordance with at least one embodiment, each bumper could possibly be connected to the vehicle body by means of two, or more, such impact-absorbing damping devices, which could be spaced apart from one another along the length of the bumper.

To explain more fully, referring to FIG. 1a, in accordance with at least one embodiment of the present invention, in the event of a collision, tube 2 would be forceably pushed into the retaining tube 12. This would result in tube 1 and element 9, being simultaneously forced into tube 2, against the elastomer body 3. In response to a sufficiently strong force, the elastomer body 3 would be capable of deforming and moving into the ring shaped space 7.

Figure 2:
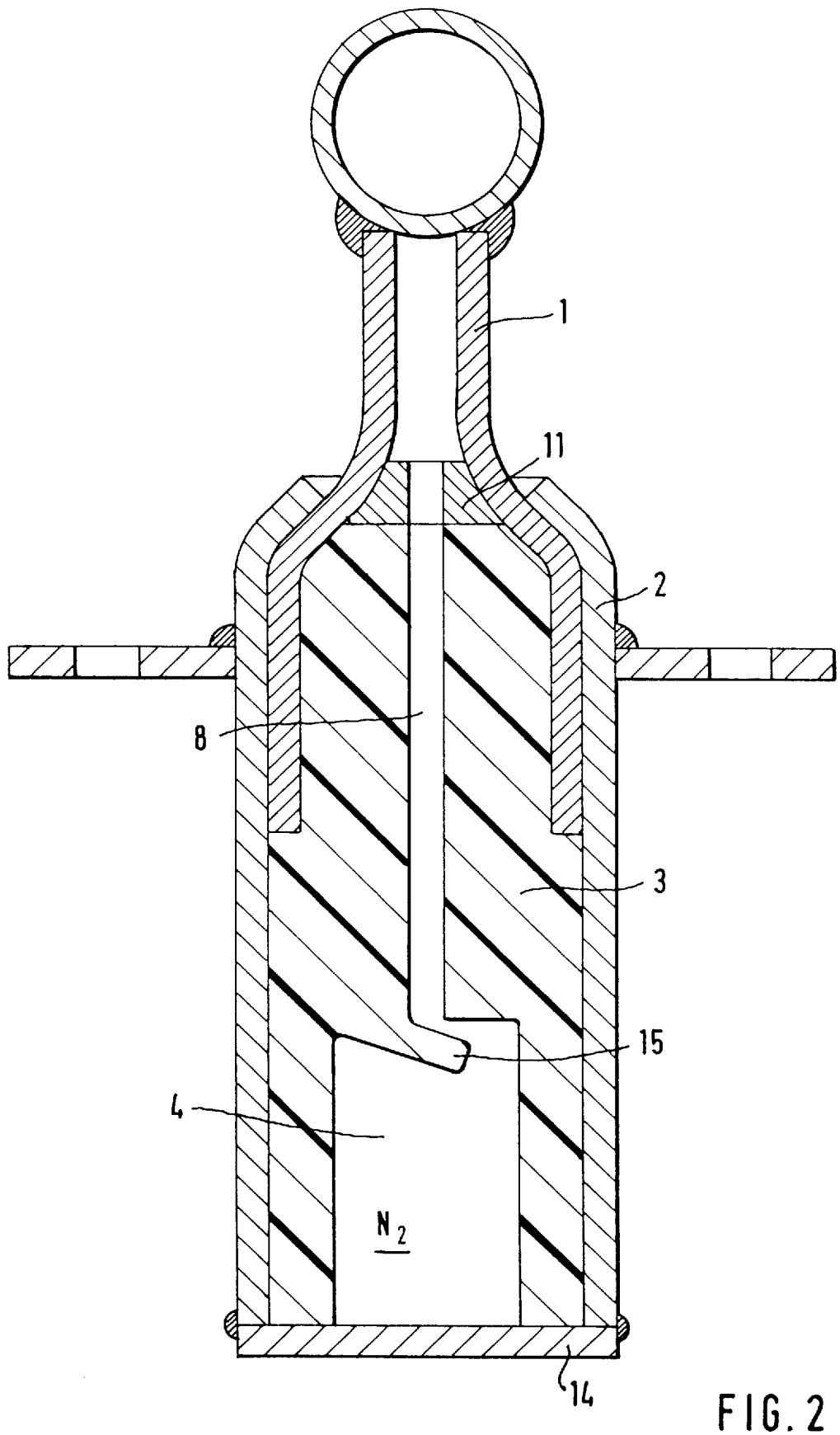
FIG. 2 shows an additional embodiment of an impact-absorbing damping device with an elastomer element, also in cross section.
Figure 2A:
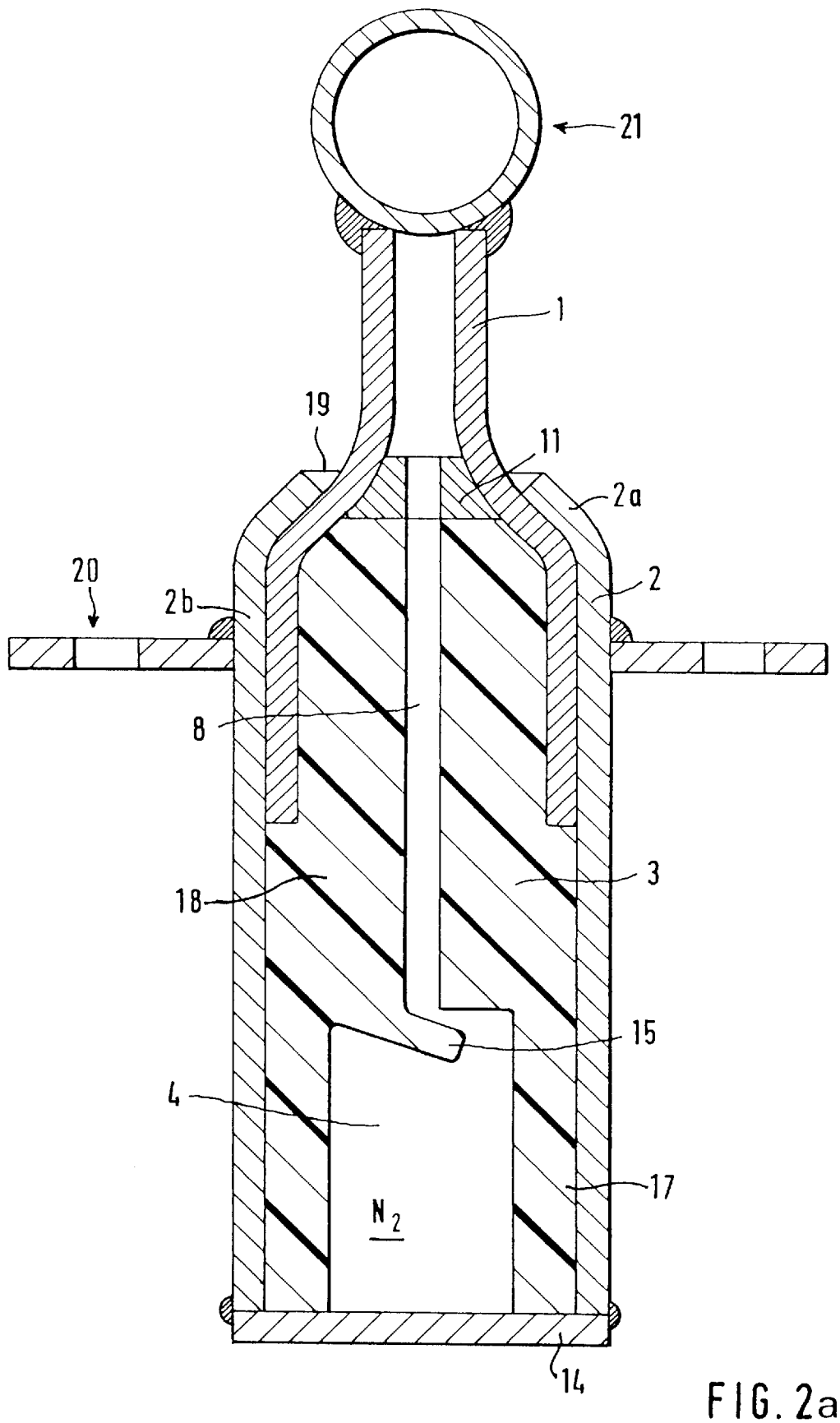
FIG. 2a is the same as FIG. 2, with additional details therefore.

FIG. 2 shows an additional embodiment of an impact-absorbing damping device, in which the tube 1 is used as the container tube for fastening the device to the vehicle, while the tube 2 is provided as a guide tube with a corresponding bottom 14. Inside the elastomer body 3, the cavity 4 is in communication by means of a channel 8 which is used to charge the cavity 4 with gas, whereby there is a deformation element 11 upstream of the elastomer body 3. The deformation element 11 expands the tube in the event of a collision. A non-return valve 15 is thereby realized in one piece with the elastomer body 3 in the form of a lip. As a result of a corresponding pressure increase in the cavity 4, the non-return valve 15 can preferably close after the charging.

To further explain, in accordance with an embodiment, with reference to FIGS. 2 and 2a, the elastomer body 3 is located within the guide tube 2, as well as within one end of tube 1, which tube 1 preferably extends into tube 2, through a hole or neck area 19 in end 2a of the tube 2. Positioned at the top of the elastomer body 3, adjacent the neck area 19, is a deformation element 11. In accordance with an embodiment, the damping device could conceivably operate such that in the event of a sufficiently strong collision, the resultant force could push the tube 1 past the deformation element 11 and further into the guide tube 2. As tube 1 is forceably moved past the deformation element 11, this element could expand tube 1, and could conceivably force tube 1 outwardly toward the side wall 2b of tube 2. This would essentially require that tube 1 be preferably composed of a material capable of deformation if sufficient force is exerted. In an embodiment, this tube 1 expansion could possibly be accomplished in a manner similar to the functioning of a mandrel in a seamless pipe machine.

Further, an embodiment would also preferably require that the elastomer body 3 be designed in such a manner, and constructed of such material, whereby deformation element 11 would be provided sufficient support so as to allow it to stay positioned to the extent necessary to enable it to forceably expand tube 1. At the same time, in this embodiment, the elastomer body 3 must also preferably be malleable enough so as to allow tube 1 to move into tube 2. This would require the end of tube 1 to either forceably compress or cut into the elastomer body 3, as it enters tube 2.

Further, in accordance with an embodiment, the elastomer body 3 should preferably be of a composition and design which would allow it to reduce energy through deformation into cavity 4, yet as described above, still adequately support the deformation element 11. Therefore, this elastomer body 3 could conceivably be designed and constructed in a manner which would control the extent of, or areas in which, the elastomer body 3 deforms, so that deformation element 11 can be adequately supported and properly function. This could possibly be accomplished in a number of ways. In at least one embodiment, the cavity 4 is positioned in the lower end of the damping device, adjacent to the bottom 14. The elastomer body 3 would therefore preferably have a substantially solid upper body section 18 attached to a lower annular shaped wall surface 17 surrounding the cavity 4 (see FIG. 2a). In one embodiment, in the event of an impact, the upper body section 18 could conceivably deform downward somewhat and somewhat into the cavity 4, while the lower annular wall surface 17 could be designed to be of such a strength so as to enable it to stay substantially intact, and thereby provide some support to the body section 18 and the deformation element 11. In yet another embodiment, the annular wall surface 17 could conceivably be designed so as to allow it to deform somewhat into the cavity 4, while the upper body section 18 could be configured so as to remain substantially in place, at least to the extent necessary for the adequate functioning of the deformation element 11.

On both of the embodiments illustrated in FIG. 1 and FIG. 2, first of all an energy reduction is achieved by the friction of the elastomer body or element 3 which is in contact with the tube. There is a further reduction of energy as a result of the deformation of the elastomer body into the cavity 4 or into the ring-shaped space 7. Corresponding pre-pressurization of the elastomer body 3 can also be achieved by a corresponding pressurization of the cavity 4.

In accordance with at least one embodiment of the present invention, additional capabilities for the reduction of energy can be created by providing at least one tube with a predetermined breaking point or a predetermined buckling point. As illustrated in FIG. 1a, in one embodiment, this breaking point or buckling point can be created by a deformation or dimple 16 located in tube 1.

One feature of the present invention resides broadly in the impact-absorbing damping device which has at least two telescoping tubes, in particular for motor vehicles, to decelerate a vehicle when it collides with an obstacle by means of damping and/or spring forces, characterized by the fact that the cavity of at least one tube 1, 2 is provided with an elastomer body 3.

Another feature of the present invention resides broadly in the impact-absorbing damping device characterized by the fact that the elastomer body 3 has a cavity 4.

Yet another feature of the present invention resides broadly in the impact-absorbing damping device characterized by the fact that the elastomer body 3, together with its outer surface 5 and the inner surface 6 of the tube 2, forms a ring-shaped space 7.

Still another feature of the present invention resides broadly in the impact-absorbing damping device characterized by the fact that upstream of the elastomer body 3 there is at least one element 9 which has at least one safety opening 10.

A further feature of the present invention resides broadly in the impact-absorbing damping device characterized by the fact that the elastomer body 3 has a channel 8 which empties into a cavity 4.

Another feature of the present invention resides broadly in the impact-absorbing damping device characterized by the fact that the cavity 4 is pre-pressurized, pre-loaded or biased with compressed gas or gas under pressure.

Yet another feature of the present invention resides broadly in the impact-absorbing damping device characterized by the fact that upstream of the elastomer body 3, there is a deformation element 11.

Still another feature of the present invention resides broadly in the impact-absorbing damping device characterized by the fact that there is at least one tube 1, 2 which has a predetermined breaking point or predetermined buckling point.

Some additional examples of impact absorbers and the components thereof which could be used in conjunction with at least one embodiment of the present invention are disclosed by the following U.S. Pat. No. 4,988,081 to Dohrmann, entitled "Impact Damper for a Motor Vehicle"; U.S. Pat. No. 5,242,157 to Bonenberger, Kirchner and Wagner, entitled "Impact Damper"; and U.S. Pat. No. 5,285,877 to Bonenberger, Kirchner and Wagner, entitled "Impact Damper".

Some examples of elastomers and/or elastomer compositions, and/or products composed therefrom, as well as components thereof which may be used in conjunction with at least one embodiment of the present invention may be found in U.S. Pat. No. 5,380,797 issued on Jan. 10, 1995 and entitled "High Impact Strength Polymer Blends"; U.S. Pat. No. 5,386,973 issued on Feb. 7, 1995 and entitled "Elastomeric Bearing"; U.S. Pat. No. 5,387,648 issued on Feb. 7, 1995 and entitled "Thermoplastic Elastomers Based Upon Chlorosulfonated Polyethylene and a Crystalline Olefin Polymer"; U.S. Pat. No. 5,391,623 issued on Feb. 21, 1995 and entitled "Elastomer/Aramid Fiber Dispersion"; U.S. Pat. No. 5,391,682 issued on Feb. 21, 1995 and entitled "Thermoplastic Polyurethane Elastomer, Process for Producing Same, Apparatus Producing Same and Elastomer Fibers Made From Same"; U.S. Pat. No. 5,397,832 issued on Mar. 14, 1995 and entitled Thermoplastic Elastomer Having Improved Low Temperature Properties"; U.S. Pat. No. 5,397,833 issued on Mar. 14, 1995 and entitled "Compatibilization of Elastomer Blends Using Ethylene/Acrylate/Acrylic Acid Terpolymers"; U.S. Pat. No. 5,397,835 issued on Mar. 14, 1995 and entitled "Polyamide Thermoplastic Elastomer Obtained by Blending" U.S. Pat. No. 5,456,716 issued on Oct. 10, 1995, and entitled "Elastomeric Valve Assembly"; U.S. Pat. No. 5,446,064 issued on Aug. 29, 1995 and entitled "Thermoplastic Elastomer Composition"; U.S. Pat. No. 5,378,543, issued on Jan. 3, 1995 and entitled "Thermoplastic Elastomer Laminates and Glass Run Channels Molded Therefrom"; U.S. Pat. No. 5,417,407 issued on May 23, 1995 and entitled "Adjustable Elastomer Torsion Device"; and U.S. Pat. No. 5,410,009 issued on Apr. 25, 1995 and entitled "Polyurethaneurea Elastomer".

Some examples of mandrels and/or other pipe or metal related methods, tools or devices, as well as components thereof which may be used in conjunction with at least one embodiment of the present invention may be found in U.S. Pat. No. 5,382,151 issued on Jan. 17, 1995 and entitled "Tool for Cold Form Flaring Tubing Ends"; U.S. Pat. No. 5,387,098, issued on Feb. 7, 1995 and entitled "Flexible Reusable Mandrels"; U.S. Pat. No. 5,390,526 issued on Feb. 21, 1995 and entitled "Double-Profile Drawing Tool"; U.S. Pat. No. 5,409,651 issued on Apr. 25, 1995 and entitled "Method of Forming Tubular Parts": U.S. Pat. No. 5,379,625 issued on Jan. 10, 1995 and entitled "Method and Apparatus for Upsetting the Ends of Steel Pipe"; U.S. Pat. No. 5,439,320 issued on Aug. 8, 1995 and entitled "Pipe Splitting and Spreading System"; U.S. Pat. No. 5,377,515, issued on Jan. 3, 1995 and entitled "Process for Cold Pilger Rolling of Thin-Walled Pipes"; U.S. Pat. No. 5,411,619, issued on May 2, 1995 and entitled "Method for Manufacturing a Joint Pipe"; U.S. Pat. No. 5,431,221, issued on Jul. 11, 1995 and entitled "Jar Enhancer"; and U.S. Pat. No. 5,449,487, issued on Sep. 12, 1995 and entitled "Method and Apparatus for Orienting Plastic of a Pipe".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 14 682.4-12, filed on Apr. 20, 1995, having inventor Alois Hillen, and DE-OS 195 14 682.4-12 and DE-PS 195 14 682.4-12, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

PARTIAL LIST OF NOMENCLATURE

1 Tube
2 Tube
3 Elastomer body
4 Cavity
5 Outside surface of the elastomer
6 Inside surface of the tube
7 Ring-shaped space
8 Channel
9 Element
10 Safety opening
11 Deformation element
12 Retaining tube
13 Sphere
14 Bottom
15 Non-return valve

What is claimed is:

1. An impact absorbing damper for being connected between a frame and a bumper of a motor vehicle to decelerate the motor vehicle and dampen the impact upon a collision of the motor vehicle with an obstacle, said impact damper comprising:

a first tubular member for being attached to one of: the frame of a motor vehicle and the bumper of a motor vehicle;

said first tubular member having a longitudinal axis;

said first tubular member comprising a first chamber disposed therein;

a second tubular member for being attached to the other of: the frame of a motor vehicle, and the bumper of a motor vehicle;

said second tubular member being at least partially disposed within said first tubular member, said second tubular member being movable into and out of said first tubular member along the longitudinal axis;

said second tubular member comprising a second chamber disposed therein;

at least one body;

said at least one body comprising an elastomeric material;

said at least one elastomeric body being disposed in at least one of said first chamber and said second chamber to absorb and dampen the impact of a collision of the motor vehicle with an obstacle;

said at least one elastomeric body comprising a third chamber;

said third chamber not being directly connected to said first chamber or said second chamber;

a gas;

said gas being disposed in said third chamber; and said gas being under pressure;

said third chamber being separate from said first chamber and said second chamber;

said impact damper comprising at least one element disposed adjacent said at least one elastomeric body, said at least one element being disposed between said first chamber and said second chamber;

said at least one element having an opening extending from said first chamber to said second chamber;

said first tubular member having an inner surface;

said at least one elastomeric body comprising an outer surface substantially facing said inner surface of said first tubular member; and said outer surface of said at least one elastomeric body and said inner surface of said first tubular member together defining a ring-shaped space within said first chamber.

2. The impact damper according to claim 1, wherein:

said at least one element is configured and disposed to transmit force to said elastomeric body upon collision of the motor vehicle with an obstacle;

said opening of said at least one element is configured to permit fluid communication between said first chamber and said second chamber upon the melting of said at least one elastomeric body;

said impact damper comprises at least one predetermined buckling area disposed on at least one of said first tubular member and said second tubular member; and said predetermined buckling area being disposed and configured to buckle upon application of sufficient force upon a collision of the motor vehicle with an obstacle.

3. An impact absorbing damper for being connected between a frame and a bumper of a motor vehicle to decelerate the motor vehicle and dampen the impact upon a collision of the motor vehicle with an obstacle, said impact damper comprising:

a first tubular member for being attached to one of: the frame of a motor vehicle and the bumper of a motor vehicle;

said first tubular member having a longitudinal axis;

said first tubular member comprising a first chamber disposed therein;

a second tubular member for being attached to the other of: the frame of a motor vehicle, and the bumper of a motor vehicle;

said second tubular member being at least partially disposed within said first tubular member, said second tubular member being movable into and out of said first tubular member along the longitudinal axis;

said second tubular member comprising a second chamber disposed therein;

at least one body;

said at least one body comprising an elastomeric material;

said at least one elastomeric body being disposed in at least one of said first chamber and said second chamber to absorb and dampen the impact of a collision of the motor vehicle with an obstacle;

said at least one elastomeric body comprising a third chamber;

said third chamber not being directly connected to said first chamber or said second chamber;

a gas;

said gas being disposed in said third chamber; and said gas being under pressure;

said first tubular member having an inner surface;

said at least one elastomeric body comprising an outer surface substantially facing said inner surface of said first tubular member; and said outer surface of said at least one elastomeric body and said inner surface of said first tubular member together defining a ring-shaped space within said first chamber.

4. The impact damper according to claim 3, wherein:

said impact damper comprises at least one element disposed adjacent said at least one elastomeric body;

said at least one element being disposed between said first chamber and said second chamber;

said at least one element being configured and disposed to transmit force to said elastomeric body upon collision of the motor vehicle with an obstacle;

said at least one element having an opening extending from said first chamber to said second chamber;

said opening in said at least one element being configured to permit communication between said first chamber and said second chamber upon the melting of said at least one elastomeric body.

5. The impact damper according to claim 4, wherein:

said impact damper comprises at least one predetermined buckling area disposed on at least one of said first tubular member and said second tubular member; and said predetermined buckling area being configured and disposed to buckle upon application of sufficient force upon a collision of the motor vehicle with an obstacle;

said impact damper further comprises a third tubular member;

said third tubular member being connected to said second tubular member;

said third tubular member surrounding said second tubular member and at least a portion of said first tubular member; and said third tubular member comprises structure for attaching said third tubular member to one of: the frame of a motor vehicle, and the bumper of a motor vehicle.

6. An impact absorbing damper for a motor vehicle, for decelerating the motor vehicle and dampening the force of impact upon the collision of the motor vehicle with an obstacle, the motor vehicle comprising a first part and a second part configured and disposed to be movable with respect to one another, said impact damper comprising:

a first tubular member for being attached to one of: the first part of the motor vehicle and the second part the motor vehicle;

said first tubular member having a longitudinal axis;

said first tubular member comprising a first chamber disposed therein;

a second tubular member for being attached to the other of: the first part of the motor vehicle and the second part of the motor vehicle;

said second tubular member being at least partially disposed within said first tubular member, said second tubular member being movable into and out of said first tubular member along the longitudinal axis;

said second tubular member comprising a second chamber disposed therein;

at least one elastomeric body being disposed in at least one of said first chamber and said second chamber to absorb and dampen impact from a collision of the motor vehicle with an obstacle:

said at least one elastomeric body comprising a closed third chamber;

a gas;

said gas being disposed in said third chamber;

said gas being under pressure;

said impact damper comprising at least one element disposed adjacent said elastomeric body;

said at least one element being disposed between said first chamber and said second chamber;

said at least one element having an opening extending from said first chamber to said second chamber;

said first tubular member having an inner surface;

said at least one elastomeric body comprising an outer surface substantially facing said inner surface of said first tubular member; and said outer surface of said at least one elastomeric body and said inner surface of said first tubular member together defining a ring-shaped space within said first chamber.

7. The impact damper according to claim 6, wherein:

said at least one element being configured and disposed to transmit force to said at least one elastomeric body upon collision of the object with an obstacle;

said opening of said at least one element being configured to permit fluid communication between said first chamber and said second chamber upon the melting of said at least one elastomeric body;

said impact damper comprises at least one predetermined buckling area disposed on at least one of said first tubular member and said second tubular member; and said predetermined buckling area being configured and disposed to buckle upon application of sufficient force upon a collision of the motor vehicle with an obstacle.

* * * * *